UNITED STATES PATENT OFFICE.

WILLIAM MORRISON, OF DES MOINES, IOWA.

ALKALINE BATTERY.

1,020,568.  Specification of Letters Patent.  Patented Mar. 19, 1912.

No Drawing.  Application filed November 14, 1910. Serial No. 592,336.

*To all whom it may concern:*

Be it known that I, WILLIAM MORRISON, a citizen of the United States of America, and resident of Des Moines, Polk county, Iowa, have invented a certain new and useful Improvement in Alkaline Batteries, of which the following is a specification.

My invention relates to improvements in alkaline batteries, and has for its object the production of a depolarizing material which, when applied to a suitable support or grid, in the proper manner, produces an efficient plate.

A further object is the production of a positive pole plate in which mercury is combined with copper, or with copper and silver, in such a manner as to produce a negative element of great efficiency and cheapness.

In the preparation of the element in which mercury and copper are used, I take, for example, one pound of copper to from three to nine pounds of mercury, and dissolve them in nitric acid. I then add caustic potash in excess of that necessary to precipitate both, and thus precipitate the oxids of copper and mercury. I then wash the precipitate in hot water, preferably containing a little caustic soda or potash, and dry the precipitate. The precipitate is then packed into a suitable support or grid; for example, one of copper, such as shown in my United States Patent No. 976,824, issued November 22, 1910, great pressure being used in forcing the material in place. The positive pole electrode is then ready for use in an alkaline battery, without forming.

Where a higher conductivity is desired, instead of using all copper, I may use part copper and part silver. The proportion of the copper and silver may vary to a large extent, and in fact very good results are obtained by using all silver in the manner described in my United States Patent No. 975,980, issued November 15, 1910. I prepare the element when I use both copper and silver in combination with the mercury, in the same manner as described above for the preparation of the element when only copper and mercury are used. When used in a battery with a suitable alkaline electrolyte and suitable negative pole plate, the depolarizing material is reduced upon discharge, and if said discharge is carried far enough, is reduced to a copper amalgam or a copper and silver amalgam, which upon the recharge again oxidizes, resuming its original state. In practice, however, I do not carry the discharge far enough to reduce the copper, but merely reduce the silver and part or all of the mercury, and in case only copper and mercury are used, only the mercury is reduced, which reduces first on account of its higher potential. This is a very important feature of my invention, as the lower oxids of copper are very slightly soluble in potassium hydroxid. But as the copper is not reduced to this point, it is not attacked. In practice, we accomplish this result by making the negative pole plate of such capacity that it will only reduce the mercury of the positive pole plate, and thus the copper merely acts as a support for the mercury. By dissolving the materials and precipitating the oxids, the copper, the silver and mercury are completely mixed in proper proportion, and in much better shape than when the oxids of the metals are mechanically mixed. By the use of the excess of caustic potash, the metals are oxidized to a very high state of oxidation, and approximately that which they will receive in the recharge of the battery, and consequently the depolarizer should be packed into the plate as solidly as possible, as on the discharge the oxygen from the plate leaves the material quite porous.

Plates may also be made by other methods. For instance, after applying the oxids of copper and mercury, or copper, silver and mercury, as the case may be, to the support, and prior to using the electrode in a battery I may subject it to electrolytic reduction in a solution of potassium hydrate. The oxids will be reduced, leaving a very porous, absorbent active material of copper and mercury, or copper, silver and mercury, and in this shape it will be seen it could be applied to a battery, but this is not as advantageous as applying the oxids direct.

While I describe the use of oxids as my preferred method of making this electrode, by preliminary reduction, good results might be obtained by the use of other compounds or salts of copper, silver and mercury, such as the chlorids, for example. I prefer, however, to use the oxids, as they are already depolarizers, obviating the expense of reduction and reoxidation. It will be noted that the materials are combined in such proportions and in such manner as to provide the greatest amount of mercury which it is possible to hold in a solid condition by the copper, or copper and silver, when the element is discharged.

It is, of course, understood that I do not limit myself to the exact proportions noted above, as a workable battery may be made in which plates are used in which different proportions of copper, silver and mercury are employed. It is obvious that a large amount of copper in proportion to the amount of silver decreases the cost. Where a great conductivity is desired, however, it is better to use a sufficient amount of silver to accomplish this function, owing to the much higher conductivity of silver than copper.

I claim:

1. A positive-pole electrode for reversible galvanic batteries, comprising a conductor or support, and a mechanically applied intimate mixture containing finely divided compounds of copper and mercury.

2. A positive-pole electrode for reversible galvanic batteries, comprising a conductor or support, and a mechanically applied intimate mixture containing finely divided compounds of copper, silver and mercury.

3. A positive-pole electrode for reversible alkaline batteries, comprising a conductor or support, and a mechanically applied intimate mixture containing finely divided oxids of copper and mercury on said support.

4. A positive-pole electrode for reversible alkaline batteries, comprising a conductor or support, and a mechanically applied intimate mixture containing finely divided oxids of copper, silver and mercury on said support.

5. A positive-pole electrode for reversible alkaline batteries, comprising a conductor or support, and a mechanically applied intimate mixture containing finely divided oxids of copper and mercury on said support, the proportion of the mercury oxid in the mixture being relatively large.

6. A positive-pole electrode for reversible alkaline batteries, comprising a conductor or support, and a mechanically applied intimate mixture containing finely divided oxids of copper, silver and mercury on said support, the proportion of the mercury oxid in the mixture being relatively large.

7. A positive-pole electrode for reversible alkaline batteries, comprising a conductor or support, and a mechanically applied intimate mixture containing chemically precipitated oxids of copper and mercury on said support, the proportion of the mercury oxid in the mixture being relatively large.

8. A positive-pole electrode for reversible alkaline batteries, comprising a conductor or support, and a mechanically applied intimate mixture containing chemically-precipitated oxids of copper, silver and mercury on said support, the proportion of the mercury oxid in the mixture being relatively large.

9. The process of making a positive-pole electrode for reversible alkaline batteries, which consists in producing an intimate mixture containing finely divided compounds of copper, silver and mercury, applying said mixture to a conductor or support, and electrolytically reducing said compounds to copper, silver and mercury.

10. The process of making a positive-pole electrode for reversible alkaline batteries, which consists in producing an intimate mixture containing finely divided compounds of copper and mercury, applying said mixture to a conductor or support, and electrolytically reducing said compounds to copper and mercury.

11. The process of making a positive-pole electrode for reversible alkaline batteries, which consists in producing an intimate mixture containing finely divided oxids of copper and mercury, applying said mixture to a conductor or support, and electrolytically reducing said oxids to copper and mercury.

12. The process of making a positive-pole electrode for reversible alkaline batteries, which consists in producing an intimate mixture containing finely divided oxids of copper, silver and mercury, applying said mixture to a conductor or support, and electrolytically reducing said oxids to copper, silver and mercury.

13. The process of making a positive-pole electrode for reversible alkaline batteries, which consists in producing a solution containing salts of copper and mercury, chemically precipitating a mixture containing oxids of copper and mercury from said solution, and applying said mixture to a support or conductor.

14. The process of making a positive-pole electrode for reversible alkaline batteries, which consists in producing a solution containing salts of copper, silver and mercury, chemically precipitating a mixture containing oxids of copper, silver and mercury from said solution, and applying said mixture to a support or conductor.

Signed by me at Chicago, Illinois, this 10th day of November, 1910.

WILLIAM MORRISON.

Witnesses:
S. LEWIS,
RUSSELL KEARNS.